United States Patent [19]
Smarook

[11] 3,919,379
[45] Nov. 11, 1975

[54] FORMING A MULTICELL CONTAINER FROM A BLANK OF A THERMOFORMABLE MATERIAL

[75] Inventor: Walter H. Smarook, Somerville, N.J.

[73] Assignee: Union Carbide Corporation, New York, N.Y.

[22] Filed: Dec. 26, 1973

[21] Appl. No.: 427,479

Related U.S. Application Data

[63] Continuation-in-part of Ser. No. 213,450, Dec. 29, 1971, abandoned.

[30] Foreign Application Priority Data

Nov. 15, 1972 Canada.............................. 156744

[52] U.S. Cl. .................. 264/164; 206/139; 220/21; 264/134; 264/259; 264/265; 264/338; 425/812; 428/116; 428/119
[51] Int. Cl.² ......................................... B29C 17/02
[58] Field of Search ............. 264/41, 164, 291, 134, 264/164, 259, 265, 338; 206/139; 220/21; 425/812; 428/116, 119

[56] References Cited
UNITED STATES PATENTS

| | | | |
|---|---|---|---|
| 2,502,304 | 3/1950 | Baker.............................. | 264/41 X |
| 2,962,409 | 11/1960 | Ludlow et al.................. | 264/261 X |
| 3,277,535 | 10/1966 | Rupert........................ | 425/812 UX |
| 3,367,760 | 2/1968 | Bendig et al................. | 264/291 X |

FOREIGN PATENTS OR APPLICATIONS

| | | | |
|---|---|---|---|
| 47-46782 | 11/1972 | Japan............................ | 264/164 |
| 1,015,330 | 12/1965 | United Kingdom............ | 264/164 |

OTHER PUBLICATIONS
McLaren, A. D.; T.T.LI; Robert Rager and H. Mark, "Adhesion, IV, The Meaning of Tack Temperature," in *Journal of Polymer Science*, Vol. VII, No. 5, pp. 463–471 (1951).

Sharpe, Louis H. and Harold Schonhorn, "Surface Energetics, Adhesion, and Adhesive Joints," in *Contact Angle, Wettability, and Adhesion*, The Kendall Award Symposium honoring William A. Zisman sponsored by the Division of Colloid and Surface Chemistry at the 144th Meeting of the American Chemical Society, Los Angeles, Calif., Apr. 2–3, 1963, Washington, D.C., American Chemical Society, 1964, (Advances in Chemistry Series 43), pp. 189–201.

*Encyclopedia of Polymer Science and Technology*, Vol. 3, Section: "Characterization of Polymers," New York, Interscience, 1965, pp. 619–621.

Primary Examiner—Philip Anderson
Attorney, Agent, or Firm—J. J. O'Connell

[57] ABSTRACT

Integrally formed multicell containers are prepared in an essentially one step, low pressure process by expanding the cross-section of a sheet of thermoformable material with the attendant formation of a plurality of voids or cells having a partial vacuum or reduced pressure within the cross-section of such expanded sheet while venting the voids during the expansion of the cross-section so as to equilibrate the level of pressure within the voids with the level of pressure without the expanded sheet of thermoformable material so as to thereby regulate the uniformity and integrity of the resulting cross-sectional geometry of the expanded sheet, which is a multicell container.

21 Claims, 19 Drawing Figures

FORMING A MULTICELL CONTAINER FROM A BLANK OF A THERMOFORMABLE MATERIAL

CROSS-REFERENCE TO RELATED PATENT APPLICATIONS

This patent application is a continuation-in-part of patent application Ser. No. 213,450 filed Dec. 29, 1971, now abandoned.

BACKGROUND OF THE INVENTION

1. Field of the Invention

This invention relates to the art of forming or shaping multicell containers from thermoformable materials.

2. Description of the Prior Art

The present day marketing of products at the retail level requires the use of vast amounts of plastics for packaging purposes, including plastic containers. Billions of plastic container units are probaby used on an annual basis in the United States alone. The preparation of many of these containers requires the use of fabrication procedures which are time consuming, expensive or wasteful; or which require the use of complicated equipment which is expensive to make, use and/or maintain; or which are relatively limited with respect to the type of plastics that may be used therein. For the preparation of a plastic container which is to comprise a plurality of compartments or cells for the containment of a plurality of packaged items it is usually necessary to prepare such a container by a multi-step process which may also entail the use of high pressures and/or adhesives. Furthermore in many cases, the fabrication of a plastic packaging item with undercut features at the cell openings of the containers is either impossible or impractical because of the multi-component parts which would be required of the mold itself in order to permit removal of an undercut molding of this type from the mold.

SUMMARY OF THE INVENTION

Multicell containers are made from thermoformable materials in a relatively facile manner by expanding the cross-section of a sheet of the thermoformable material in such a way that a plurality of voids or cells of reduced pressure are formed within the cross-section, and simultaneously venting the voids during the expansion of the cross-section of the sheet so as to equilibrate the pressure within the voids with the pressure without the expanded sheet so as to thereby regulate the uniformity and integrity of the resulting cross-sectional geometry in the expanded sheet.

An object of the present invention is to provide a process whereby integrally formed multicell containers may be made from thermoformable materials.

Another object of the present invention is to provide novel process for forming multicell containers wherein the openings in each of the cells have relatively thin, deformable, lip members around the periphery thereof for firmly holding in such cells items to be packaged therein.

A further object of this invention is to provide a process for forming a multicell container having shock absorbancy and cushioning therein by utilizing a deformable thin lip about the periphery of each cell which may be deformed by insertion in the cells of an object to be packaged therein.

A further object of the present invention is to provide an essentially one step process wherein multicell containers may be readily formed integrally from thermoformable materials, using assembly line techniques, and with low pressures without the use of adhesives.

DEFINITIONS

With respect to the herein provided description, examples and claims relating to the present invention the following definitions apply:

"Thermoformable" means that the thereby described material is a solid at 25°C. which can be reshaped or reformed above some higher temperature.

"Thermoplastic" means that the thereby described material is a solid at 25°C. which will soften or flow to a measurable degree above some higher temperature.

"Thermoset" means that the thereby described material is a solid at 25°C. which will not soften or flow, or cannot be reformed, at any higher temperature.

"Crystalline" means that the thereby described polymeric material exhibits a definite X-ray pattern for at least 50% of its polymeric structure when subjected to X-ray analysis.

"Amorphous" means that the thereby described polymeric material is devoid of a definite X-ray pattern for more than 50% of its polymeric structure when subjected to X-ray analysis.

"Ta" means the temperature at which a thermoplastic material exhibits hot tack adhesion.

"Tm" means, with respect to a crystalline polymer, the melting point of such polymer.

"Tg" means, with respect to an amorphous polymer, the temperature at which such polymer changes from a brittle to a rubbery condition. In a crystalline polymer it is the temperature at which the polymer becomes glassy.

"Plastic" means a natural or synthetic resin.

"Normally solid" means solid at 25°C.

"Wet" or "Wetting" means the relative ability of one material to achieve interfacial contact with another material.

"Hot tack adhesion" means the ability of one material to exhibit adhesion to a second material while the first material is in a molten state, above its Tm or Tg.

"Fusion point" means a temperature at which a material softens or melts.

"Cohesive Flow Property" means the property of a material in the molten state to be so readily distorted by external forces that the geometric cross-sectional area of such material will change substantially under such forces.

"Heat Distortion Point" means the temperature of a material as measured by ASTM D-648.

Most thermoformable materials have a Ta, i.e., a temperature at which they will exhibit hot tack adhesion to other materials. In the case of crystalline polymeric materials this Ta occurs about 5° to 10°C. above the Tm of such polymeric materials.

In the case of amorphous materials the Ta varies considerably, depending on the structure and molecular weight of the material. For the amorphous polymers, therefore, the Ta may be about 30° to 150°C. above the Tg of such polymers.

The Tm or Tg will also vary for a given polymeric backbone, depending on the molecular weight and density of the polymer.

The following is a listing of various polymeric materials which may be used in the present invention with a listing of their Tm or Tg, and their Ta, in °C. The Ta values reported here specifically relate to the Ta of the polymer when the polymer is being adhered to an aluminum substrate. The Ta value will be essentially the same for other substrates.

faces of such mold plates as disclosed below, during the expansion operation.

| Polymer | | Tg | Tm | Ta |
|---|---|---|---|---|
| 1. | polyethylene Density= 0.96 M.I.=3-5 | — | 126 | 135-140 |
| 2. | polyethylene Density= 0.94 M.I.=12-15 | — | 122 | 130-135 |
| 3. | polyethylene Density=0.924 M.I.=1.2 | — | 100-108 | 120 |
| 4. | polyvinyl chloride | >5 | — | 155 |
| 5. | Nylon-6 | 60 | 215-220 | 240 |
| 6. | Nylon-6,6 | 65 | 260 | 270 |
| 7. | Polycaprolactone | — | 58 | 60 |
| 8. | Polyurethane (polyester) | — | 130-170 | 160-180 |
| 9. | Polysulfone | 185 | — | 300 |
| 10. | polypropylene | −5 to 0 | 165-170 | 170 |
| 11. | polycarbonate | 150 | — | 225 |
| 12. | polymethylmethacrylate | 90 | — | 160 |
| 13. | polystyrene | 100 | — | 185 |
| 14. | polystyrene (impact grade) | 100 | — | 180 |
| 15. | polyacetal | −60 | 165 | 170 |
| 16. | 90/10 mol % copolymer of polymethacrylonitrile and styrene | 115 | — | 240 |
| 17. | 70/30 mol % copolymer of polyvinyl alcohol and polyvinyl acetate | 50-60 | — | 120-130 |
| 18. | 94.2/5.7 mol % copolymer of ethylene and ethyl acrylate | −20 | — | 110 |
| 19. | 91.8/8.2 mol % copolymer of ethylene and acrylic acid | 18 | — | 110 |
| 20. | 82/18 wt. % copolymer of ethylene and vinyl acetate M.I.=2.3 | −15 | — | 120 |
| 21. | styrene-butadiene copolymer | 90 | — | 190 |
| 22. | styrene-acrylonitrile | 100 | — | 190 |
| 23. | hydroxy propyl cellulose | 110 | — | 140 |
| 24. | (solution blend of) polystyrene and polyphenylene oxide | 115-120 | — | 235 |
| 25. | cellulose acetate | 170 | — | 180 |
| 26. | acrylonitrile-butadiene-styrene terpolymer | 100-104 | — | 180 |

It has now been found that the cross-section of a blank of thermoformable material preferably in the shape of a sheet of such material, may be readily expanded so as to provide a large variety of multicelled containers by expanding the cross-section of such blank between a pair of mold plates so as to cause the concurrent formation of a plurality of voids or cells of reduced pressure within the expanding cross-section of such blank, and venting the voids during the expansion of such cross-section so as to equilibrate the pressure within the voids with the pressure outside the expanded sheet and thereby regulate the uniformity and integrity of the resulting cross-sectional geometry of the resulting multicell container. The expansion of the blank is conducted while the blank is heated so as to place the thermoformable material in a thermoformable state, i.e., the blank is heated to a temperature which is ≥ the softening point of the thermoformable material. The thermoformable material is expanded between a pair of separable mold plates, one being a perforated top mold plate and the other being a continuous faced bottom plate, which mold plates are moved apart to effect the desired expansion of the blank of thermoformable material, while the blank is attached to the sur-

Figure 1:
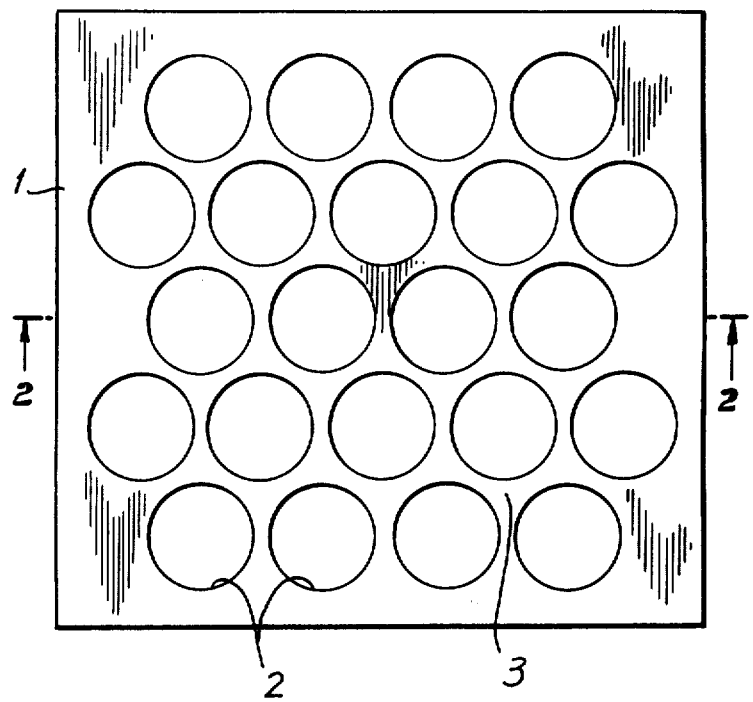
FIG. 1 shows a top view and FIG. 2 shows a cross-sectional view of a perforated mold plate which may be used as a top mold plate in the process of the present invention.

The preferred embodiment of the process of the present invention is based upon the property of various materials, and particularly thermoplastic polymeric materials, to exhibit hot-tack adhesion to practically all substrates at a temperature, Ta, which is usually above the Tg or Tm of the thermoplastic polymeric material. Thus, in a heat softened or fused or molten state, the thermoplastic polymeric material will wet out practically all substrate surfaces and thereby impart adhesion thereto. In some cases this adhesion phenomena will be lost when the thermoplastic polymeric material cools below its Tm or Tg.

Thus, if a blank of thermoplastic polymeric material is placed between two mold plates of a heated press so that the temperature of the mold plate is about Ta or 5° to 10°C. above the Ta of the polymeric material in the blank and the mold plates mechanically separated apart, the adhesive forces of the polymeric material to the surfaces of the mold plates are greater than the cohesive flow properties of the polymeric material itself during the plate separation or expansion step. As a result, it is possible to mechanically move the mold plates a certain distance apart with the polymeric material bonded to the surfaces thereof without causing a rupture of the adhesion between such surface and the fused material.

Although the mass of the expanded fusible material does not change, the cross-sectional configuration of the fusible material is expanded in the direction of the two separated plates as a result of the adhesive force of attraction between the fused thermoformable material and the surfaces of the plates. The extent to which the cross-sectional area of the fused material can be so expanded is thus primarily determined by the strength of the adhesive bond between the fused material and the surfaces of the mold plates, and the extensibility, in the molten state, of the thermoplastic resin in the blank. The stronger is such adhesive bond, the greater is the amount of cohesive flow that can be induced in the molten resin without a rupture of the adhesive bond occurring. The strength of the bond will thus depend on the nature of the thermoplastic resin in the blanks, the nature of the mold plate materials, the extent of the surface area of the mold plate which is in contact with the fused blank, and the cohesive strength and flow properties of the polymeric plastic.

Thus, the use of mold surfaces, of materials which are more readily wet by the fused plastic blank will allow for a wider separation of the mold surfaces with the fused plastic bonded thereto, than would the use of mold surfaces made from materials which are not as readily wet by the fused blanks. Thus, the use of a blank in the form of continuous sheet material will allow for the wetting with the blank of a larger amount of the surface area of the faces of the mold plates and thus allow for the attainment of greater adhesive forces between the fused blank and the mold plates.

As the mold plates are pulled apart with the heated thermoformable material bonded thereto, voids of reduced pressure are formed within the body of the expanding plastic. Thus, although the mass of plastic does not change, the volume of the expanding cross-section of the plastic does increase. The frequency of the occurrence of these voids, as well as their size and shape, i.e., the pattern of the voids, is largely determined by the pattern of the points or areas of contact which exist between the mold surfaces and the expanding plastic during the expansion process. In order to maintain the desired pattern of the voids, it is necessary to vent the voids during the expansion step so as to equilibrate the pressure within the voids with the pressure without the expanding material.

The pattern of the points or areas of contact between the mold surfaces and the thermoplastic blank can be readily varied.

For the purposes of the present invention the means for providing such pattern of contact can be generally characterized as perforation means, and such perforation means are used to provide a pattern of individual and separate perforations at the interface between the top surface of the blank and the blank contact surface of the top plate when the blank is inserted in the press between the top plate and the bottom plate. In the preferred mode of operation of the process of the present invention the pattern of the areas of contact between the surfaces of the mold plates is preferably provided by using, as the bottom plate, a continuous faced plate, and, by using as the top plate, a perforated plate as the perforation means. The bottom plate will thus provide continuous contact with the entire surface of the sheet facing such bottom plate. The perforated top plate will only provide contact with the surface of the sheet facing such top plate at the non-perforated area of such top plate.

The desired pattern of contact areas can also be supplied to the contact surfaces of the top mold plate or the sheet with other perforation means. A negative of the desired pattern can be used as such other perforation means and it can be affixed to the contact surface of the sheet which is to contact the top mold plate or affixed to the contact surface of the top mold plate itself, in the form of masking means, such as cut-outs in circular or elliptical form of masking tape, kraft paper, "Mylar film" or other materials which will prevent the fused thermoplastic material from adhering to the surface of the top mold plate. Thus, the fused plastic will only be allowed to adhere to the surface of the top mold plate at those areas of contact between the surface of the top mold plate and the sheet where there is no masking means present.

These "negatives" thus function, when used as perforation means in the process of the present invention, in a manner of procedure which is directly opposite to that of the perforated top mold plates, the use of which as perforation means is discussed above. These "negative" perforation means thus prevent contact at the interface between the top surface of the blank and the contact surface of the top mold plate at those places at the interface where such "negative" perforation means are present. The use of the perforated top mold plates, on the other hand, provides a lack of contact at such interface where the blank contact surface of the top mold plate is not present, i.e., at the areas of the interface adjacent the perforations in the top mold plate. Each of these two types of perforation means, does, however, function in the same basic manner, that is, each provides a pattern of perforations in the interface between the contact surface of the top mold plate and the top surface of the blank.

Thus, it may be said that the cross-sectional geometry of the expanded sheet is a function of the design of the areas of contact which is provided in the contact surface of the top mold plates or the surface of the blank which is to contact the top mold plate. It is such design which determines the extent to which the surface areas of the top mold plate and the blank are kept in contact during the expansion step in the process, and the extent of such contact areas is what determines the pattern of the voids or cells in the expanding blank or sheet, and thus, in the cross-sectional geometry of the resulting multicell container.

The voids or cells created in the sheet during the expansion step are vented through the top mold plate, or in the case of the use of a negative perforation means, the voids or cells are vented from the outside of the blank and between the negative and the mold plate. Venting of the negative perforation means may also be accomplished by having a vent hole over the negative perforation means which vent hold would be vented through the mold plate to the atmosphere.

The speed with which the mold plates are moved apart during the expansion of the blank is not critical. The speed to be used is governed by the cohesive flow properties of the thermoformable material used in the fused blank. Where the blank is used in the form of sheets having thicknesses of the order of about 40 to 300 mils, such blanks may be expanded about two to 20, or more, times such thicknesses according to the present invention by expanding the fused blank at a rate of separation of the mold plates of about 10 to 150 mils per second.

After the desired separating distance has been achieved, the expanded blank is cooled, to a temperature below the heat distortion point of the plastic, the press is opened and the expanded blank is removed therefrom. At this point the expanded blank may or may not continue to adhere to the surfaces of the mold plates, depending on the nature of the mold surfaces and the polymeric materials, as will be discussed below.

The expanded blank is cooled to a temperature below its heat distortion point, before being removed from the press so as to freeze, so to speak, the configuration of the expanded blank, and thus prevent distortion of such configuration.

Thus in the preferred embodiment of the process of the present invention the cross-section of the blank of thermoformable material having a Ta is expanded between a pair of mold plates so as to provide an integrally formed multicelled container in the following sequence of steps:

The blank, in the form of a continuous sheet having a top surface and a bottom surface, is inserted between a top mold plate and a bottom mold plate, with each of the plates having a surface for contacting the blank, and each of the plates having a fusion point which is higher than the Ta of such thermoformable material, the blank contacting surface of the bottom mold plate being continuous, and perforation means being used to provide a pattern of perforations at the interface between the top surface of the blank and the blank contact surface of the top mold plate, such pattern providing areas of contact and non-contact between the top surface of the blank and the blank contact surface of the top mold plate, the blank is bonded by hot tack adhesion to the sheet contacting surfaces of the mold plates, the mold plates are pulled apart, while the blank is thus adhesively bonded thereto so as to draw a portion of the thermoformable material from the blank in the form of a plurality of multi-walled cells having common walls therebetween and open ends defined by such pattern of perforations, the pulling apart of the blank effecting reduced pressure conditions within the cells.

venting the cells during such pulling apart so as to equilibrate the pressure within the cells with the pressure without the cells so as to thereby regulate the uniformity and integrity of the configuration of the cells, cooling the resulting expanded blank to a temperature below the heat distortion temperature of the thermoformable material, and separating the cooled expanded blank from the mold plates.

The mold plates which are to be used may be disengageable from the device used to move them apart during the expansion step of the process described above. One or both of the mold plates can also be more permanently affixed to such device, in which case, the cooled, expanded thermoformable material is then removed from the device and the mold plate(s) affixed thereto.

When the expanded blank is cooled below its Ta, or even below its Tm and/or Tg, it will not necessarily, in all cases, automatically lose its adhesion to the surfaces of the mold plates. The expanded blanks which are made of materials which are non-polar in nature, such as the polyolefin resins, will generally readily lose their adhesion to the surfaces of all of the types of mold plates which may be used in the process of the present invention, and which are listed below in more detail. The expanded blanks which are made of polar materials, i.e., materials comprising compounds which possess an electric moment, such as polysulfone resins and resins containing carboxyl, hydroxyl and ester groups, will tend to remain bonded to the surfaces of most, if not all, of the mold plates which may be used in the process of the present invention. However, even where adhesion between the expanded blank and the mold plates is not automatically lost upon cooling the expanded blank, the cooled expanded blank, can be mechanically stripped from the mold plates without disrupting and integrity or configuration of the expanded blank.

In addition to the use of hot tack adhesion, other means may be used for affixing the thermoformable material to the mold plates during the expansion of the cross-section of the thermoformable material. In one such other procedure the thermoformable material may be loaded with a filler which is susceptible to being magnetized such as, powdered iron and barium ferrite, and the thus filled thermoformable material may be affixed to the mold plates during the expansion step, in any desired pattern of points or areas of contact therebetween by applying a magnetic field to selected portions of the contact surfaces of the mold plates. The thermoformable material may also be affixed to the surfaces of the mold plates during the expansion step by the application of electrostatic forces between the expanding thermoformable material and selected contact areas of the surfaces of the mold plates. Regardless of the means used to affix the thermoformable material to the mold plates during the expansion step, the thermoformable material must be heated to a fused or molten state during the expansion step.

A better understanding of the process of the present invention can be obtained from the process sequences illustrated in FIGS. 1 to 5 and 5A of the drawings.

Figure 2:
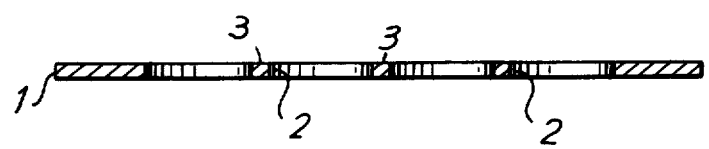

FIG. 1 shows a top view and FIG. 2 shows a cross-sectional view of a type of a top mold plate 1 which may be used in the process of the present invention. Top mold plate 1 is a sheet of material such as aluminum or steel in which a series of regularly spaced perforations 2 are punched. The perforations may have either or both of arcuate and straight sides. The perforations 2 in top mold plate 1 were all circular in shape. Each of perforations 2 formed the same sized circular perforation, with the various perforations being separated from each other by the continuous portion 3 of top mold plate 1. Perforations 2 function as the perforation means discussed above, and the continuous metal surface 3 of top mold plate 1 provides the top mold plate contact surface which will contact the upper contact surface of the blank during the expansion process.

Figure 5A:
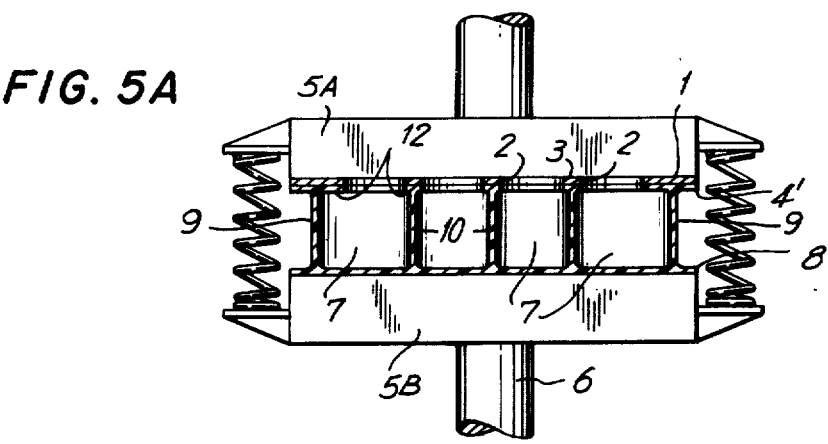
FIGS. 3–5 and 5A show a sequence of steps involved in forming a multicelled container from a blank of thermoformable material, in the form of a sheet of such material, according to one embodiment of the present invention using a perforated mold plate as shown in FIGS. 1 and 2 as a top mold plate.
Figure 3:
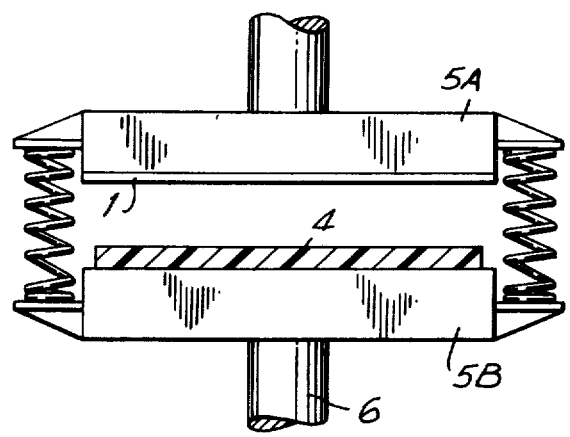
Figure 4:
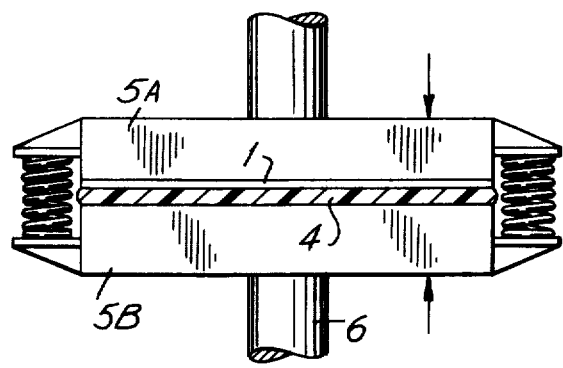
Figure 5:
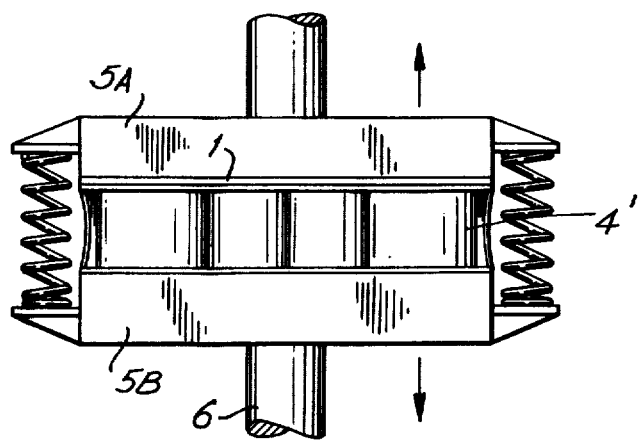

FIGS. 3 to 5 show a sequence of steps involved in using top mold plate 1 according to one modification of the process of the present invention. In FIG. 3 there is shown a blank 4 of thermoformable material having a Ta, in the form of a smooth surfaced sheet of such material, which is inserted between the open platens, 5A and 5B, of a Carver press. To the face of upper platen 5A of the press there is attached a top mold plate 1. In the embodiment shown, the continuous upper surface of lower platen 5B functions as the bottom mold plate contact surface which will contact the lower contact surface of the blank during the expansion process. Top mold plate 1 and platens 5A and 5B are heated, for the purposes of the present invention, to a temperature which is about Ta or 5° to 10°C. above the Ta of the blank 4. Top mold plate 1 and the platens 5A and 5B may be heated before, preferably, or after the blank is inserted in the press. Top mold plate 1 is preferably heated conductively through platen 5A.

The Carver press described herein is a 20 ton hand operated hydraulic ram 6 which actuates a movable 6 × 6 inches lower platen 5B again a fixed upper platen 5A. The platens are usually heated electrically. Although the Carver press is the preferred means for bringing the heated mold plates and platens into contact with the blanks, according to the present invention, other suitable devices may be used, such as heated belts.

The process of the present invention may be conducted continuously or discontinuously. Using devices such as the Carver press, the process is readily conducted discontinuously. The process may be conducted continuously by feeding a continuous blank of thermoformable material between a pair of heated continuous belts of materials suitable as mold surfaces.

FIG. 4, shows the press after it has been closed with sufficient pressure to cause the top mold plate 1 and bottom mold platen 5B to exert a slight pressure on blank 4 so as to cause the heated blank to wet the contact surfaces of top mold plate 1 and bottom mold platen 5B which come to contact with the blank. The amount of pressure required for this step is of the order of about 1 ounce to 4 pounds per square inch. The pressure causes the blank to be slightly compressed.

FIG. 5 shows the platens pulled apart after the expansion step, with the expanded blank 4' adhering to points or areas of contact with plate 1 and platen 5B.

During the expansion step, as will be discussed in more detail below, areas of reduced pressure of cells 7 arise within the cross section of the expanding blank 4'. The outside walls of the individual cells 7 are defined by rib-members 9 of the expanded blank. The limits of cells 7 are defined by the contact surface of top mold plate 1, bottom mold platen 5B and outside walls 9 and-/or inside walls 10. The reduced pressure in cells 7 is caused by the fact that each cell 7 tends to become a sealed chamber when the blank 4 fuses to the contact surfaces of top mold plate 1 and bottom mold platen 5B, and as the mold surfaces are pulled apart, the sealed cells 7 become enlarged, thus creating areas of reduced pressure. To prevent the higher ambient pressures from distorting or rupturing expanded walls 9 and 10 of the blank, cells 7 of the blank are vented during the expansion step so as to equilibrate the pressure within such cells 7 with the ambient pressure outside the blank. This venting tends to preserve the pattern and the integrity of the resulting cross-sectional geometry of the expanded blank. In this embodiment of the present invention, the venting is accomplished through the perforations 2 in top mold plate 1 and the imperfect seal that exists between the surfaces of platen 5A and top mold plate 1.

After the mold plates have been expanded the desired distance they are cooled to a temperature which is below the heat distortion point of the plastic in the blank. The cooling may be allowed to occur in the ambient air, or by circulating a cooling medium through the platens, or in some cases by a liquid coolant spray, or by conduction through cooled platens, or by a combination of such procedures.

The mold plates may be readily disengagable from the rest of the press so as to allow another set of mold plates to be inserted and used in the press with another blank of thermoformable material while a previously used set of mold plates having an expanded blank therebetween is allowed to cool. Where the bottom mold plate is to be disengageable from the rest of the press it is preferable to use a separate sheet of metal or other suitable material having a continuous blank contact surface as such bottom mold plate, rather than attempt to use the lower platen of the press for this purpose as shown in FIGS. 3 to 5 above.

FIG. 5A shows a cross-sectional view of expanded blank 4' between top mold plate 1 and lower platen 5B of the press after the expansion step, but before the expanded blank is removed therefrom. Expanded blank 4' has a continuous base member 8 from which a plurality of I beam shaped outside wall members 9 and inside wall members 10 project vertically. These wall members define the sides of cells 7 which were generated during the expansion step in the process. The cells are each sealed at the base thereof by continuous base member 8, and are each open at the upper end thereof, adjacent perforations 2 in upper mold plate 1. The lower surface of continuous base member 8 adheres to the continuous face of lower platen 5B during the expansion step. The upper ends of I beam shaped walls 9 and 10 adhere to the lower, and contact, surface of top mold plate 1 during the expansion step.

Figure 6:
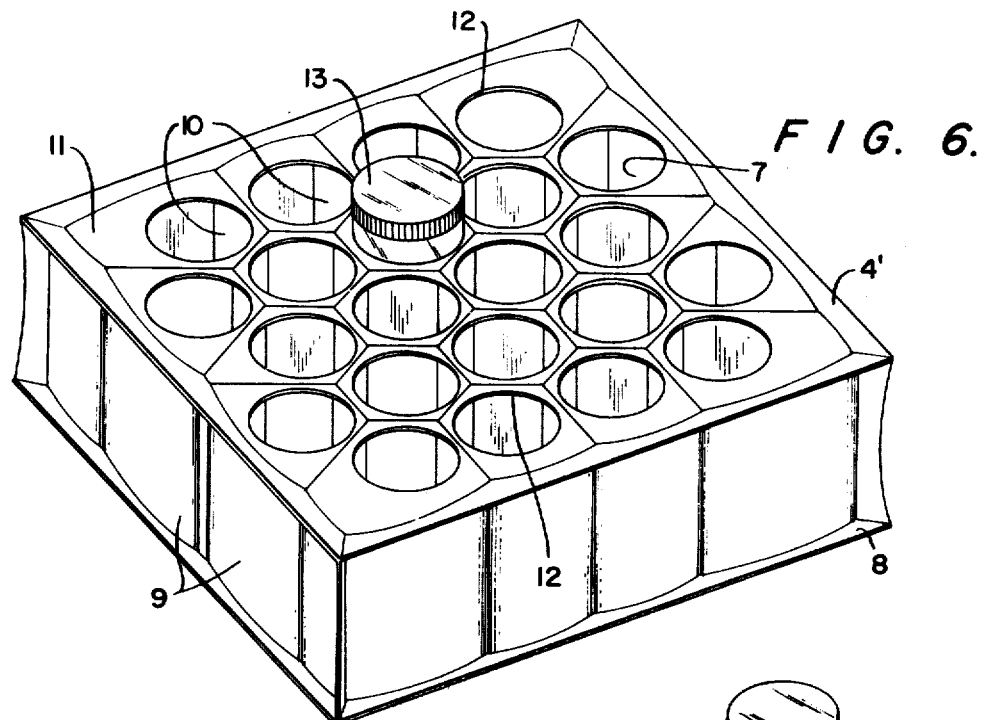
FIGS. 6, 7 and 8 show a perspective, top, and cross-sectional view, respectively, of a multicell container made with one perforated top mold plate and one continuous faced bottom plate.
Figure 7:
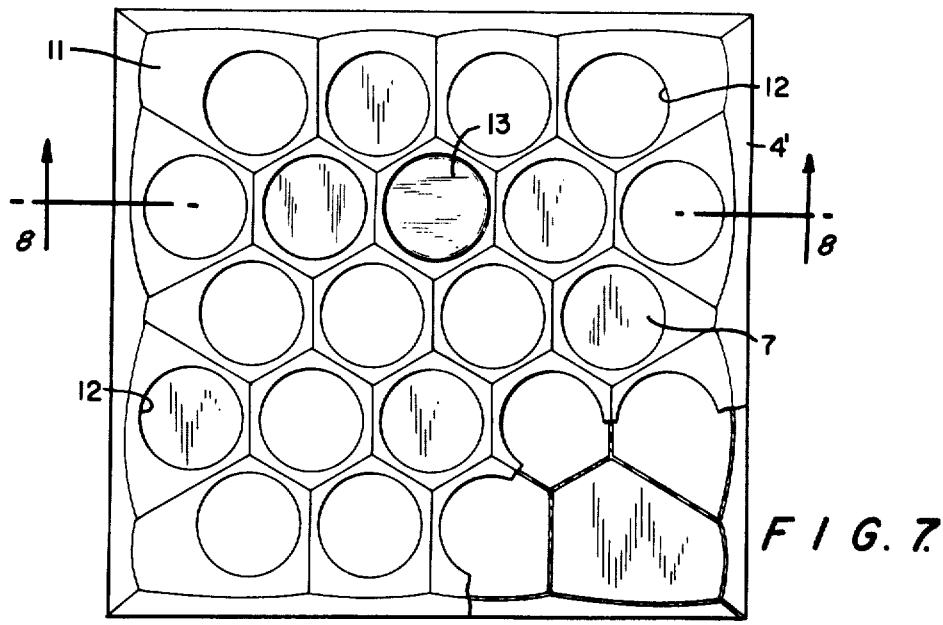
Figure 8:
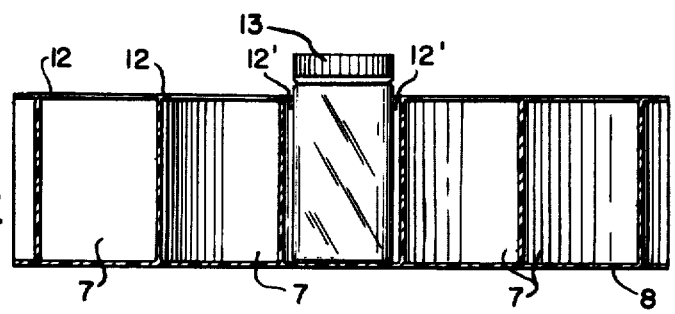

FIGS. 6 to 8 provide various views of expanded blank 4' which shows that the expanded blank 4' is a multicelled container. FIG. 6 shows a perspective view of the container.

Container 4' has a continuous smooth surfaced base member 8, and continuous outside walls 9. Each of the cells 7 in the container is thus open at the top, and enclosed at the bottom thereof by base 8. The bottom of continuous surfaced base 8 was the bottom surface of blank 4 during the expansion process, and was continuously bonded, adhesively, by hot tack adhesion contact surface of platen 5B during the expansion process. Each of the cells are also enclosed on the sides, and separated from each other, by interior walls 10 alone, or in combination with outside walls 9. Interior walls 10 and exterior walls 9 have an I beam configuration. The cells whose walls are all interior walls are symmetrical and are hexagonal in shape. These may be termed interior cells. Those cells which have both interior and exterior walls may be termed exterior cells and these are not symmetrical in shape. The differences in the shapes of the cells arises due to the shape and spacing of the perforations in the top mold plate 1. The top surface 11 of the expanded blank 4' provides a replication of the surface of the perforated top mold plate 1 which was used to form the expanded blank. Thus the solid portions of the surface 11 of expanded blank 4' represent those areas of the upper contact surface of the blank which were in contact with the non-perforated areas of top mold plate 1 during the expansion step in the process. Hexagon shaped interior cells are naturally formed when the perforations in top mold plate 1 are completely circular, even though the lip members 12 form a circle that replicates the perforations in the top mold plate. FIG. 7 shows a top view of expanded blank 4'. The irregular shape of the outside cells is more clearly seen in FIG. 7, as compared to the regular, hexagonal shape of the interior cells. The irregularity of the shape of the exterior cells arises from the need of the expanding cells to accomodate themselves to the shape of both the perforations in, and the outside edges of the top mold plate during the expansion step in the process of the present invention. Since lip members 12 tend to be flexible, a multicell container 4' can be used as a shipping and/or display carton for various articles of commerce, such as jars, cans, vials, flash light batteries, and the like, that can be snugly inserted in each cell, as shown by the insertion of a capped vial 13 in one of the cells in FIGS. 6 and 7.

The hexagonal shape of the interior cells, and the irregular shape of the exterior cells, in expanded blank 4' is due primarily to the fact that the outer rows of perforations in the top mold plate surface were not subjected to balancing hot cohesive polymeric flow. This results from the fact that the position of the interior rows of perforations in the upper mold plate is staggered with respect to the positioning of the outside rows of perforations in the upper mold plate. If a single perforated mold plate were used as the top mold plate wherein all the circular holes therein were aligned in rows and columns, then the resulting expanded blank would have regularly aligned square cells with a sealed base. Variations in the alignment and spacing of the perforations will thus produce variations in the shapes of the resulting cells. However, even though arcuate perforations are used in the top mold plates, the cells tend to have, for the most part, angular side walls.

During the expansion of the sheet of plastic to form expanded blank 4', cells 7 were vented through the perforations 2 in the top mold plate 1 of the press.

For aesthetic, or other purposes, it may be desired to expand the cross-section of the blank in a non-uniform manner so as to provide expanded blanks which have cross-sectional areas of various degrees of thickness.

FIG. 8 shows a cross-sectional view of expanded multicelled container 4' through section 8—8 of container 4' as shown in FIG. 7. Vial 13 is shown inserted in one of cells 7 with lip member 12' of such cell deformed by being bent down into the cell to accommodate the size and shape of elongated vial 13. Vial 13 is thus snugly held in the cell by the deformed lip member 12'.

Figure 9:
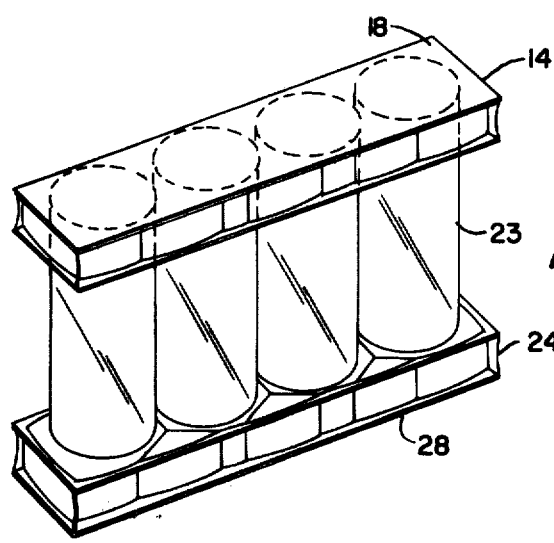

FIG. 9 shows, in perspective view, a modified manner of employing the multicell containers of the present invention. Containers 14 and 24 shown in FIG. 9 each have four cells 7, and such containers may be formed, as shown, as described above, by using a top mold plate having a row of four circular perforations therein and a smooth surfaced bottom mold plate. Containers 14 and 24 may also be formed as sections of a larger container, as container 4' shown in FIGS. 6 and 7, from which larger container, containers 14 and 24 may be cut out. Each of containers 14 and 24 have a continuous smooth surface, 18 and 28 respectively, which may be used as a base or top for the resulting composite package. The composite package is formed by inserting vials or other elongated articles of commerce 23 in the cells of container 24 and by then capping the heads of the vials 23 with the cells of container 14. The height of the cells in containers 14 and/or 24 can be so adjusted that all, or only a portion, of the height of the vials 23 is enclosed by the cells.

Figure 10:
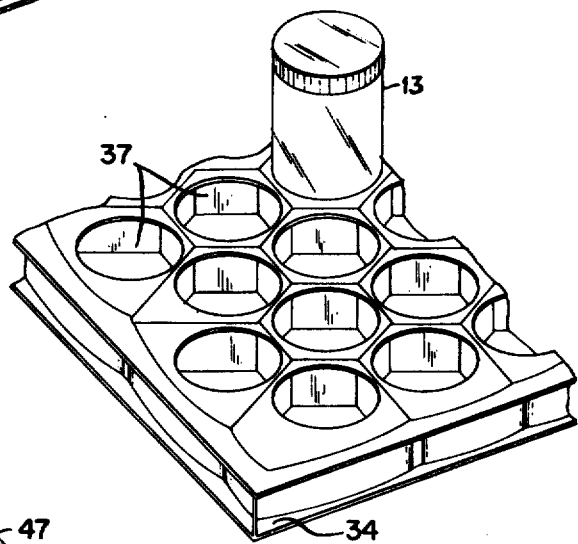
FIGS. 9–11 show variations in the multicell containers that may be prepared by the process of the present invention.
Figure 11:
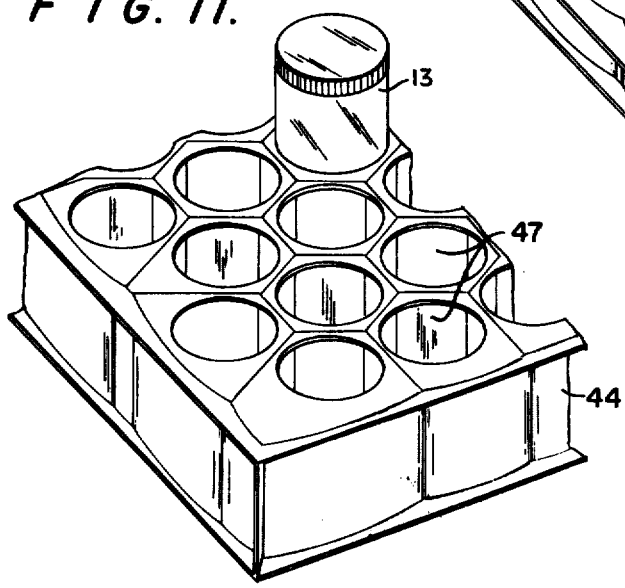

FIGS. 10 and 11 shows multicelled containers 34 and 44, respectively, wherein the height of the cells 37 and 47, respectively, therein has been varied. Thus, whereas the height of the cells shown in FIGS. 6 to 8 is approximately 90% of the height of vial 13, the height of the cells 37 in FIG. 10 is about one-fourth of the height of vial 13, and the height of the cells 47 in FIG. 11 is about one-half of the height of vial 13. The height of the cells is adjusted by the extent to which the blank is pulled apart during the expansion step in the process of the present invention.

Figure 12:
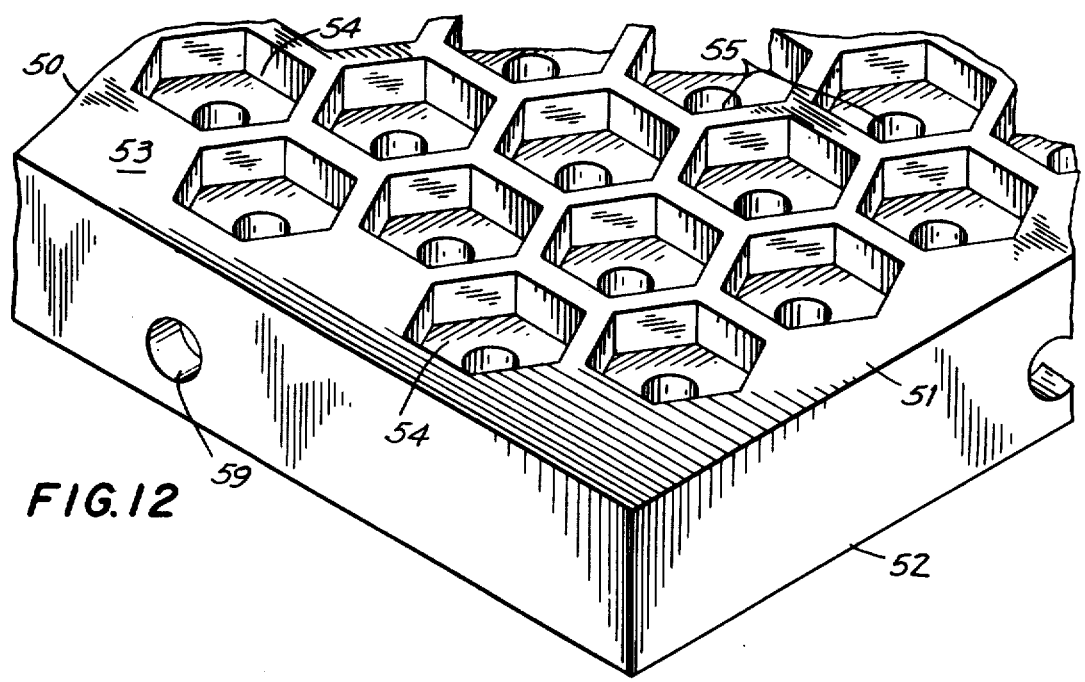
FIGS. 12, 13 and 14 show partial views of the top, bottom, and cross-section, respectively, of another type of perforated mold plate which may be used as a top mold plate in the process of the present invention.
Figure 13:
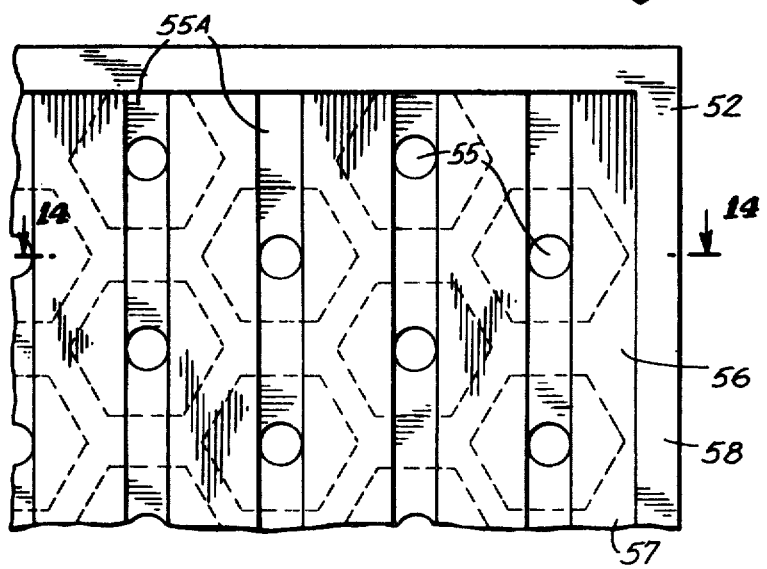
Figure 14:
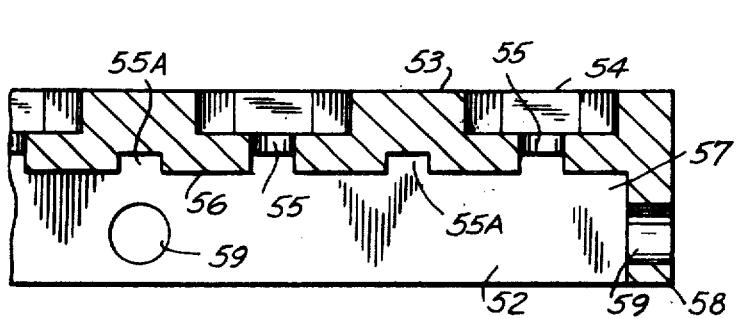

FIG. 12 shows a partial top view in perspective, FIG. 13 shows a partial view of the reverse side, and FIG. 14 shows a partial cross-sectional view, of another type or mold plate 50 which has a series of recessed cavities therein as perforations and which may be used as an upper mold plate in the process of the present invention. Mold plate 50 has a top sheet 51 of metal mounted on a hollow U-shaped frame 52. In the front face 53 of the sheet 51 a series of regularly spaced and staggered rows of hexagonal shaped perforations 54 were machined. Each of the hexagonal perforations 54 was only machined about half way through top sheet 51. In the center of the base of each of the hexagonal perforations 54 there was then drilled a small circular vent hole 55 through the remainder of sheet 51 and which exited out the other (back) face 56 of sheet 51. The circular vent holes 55 were about a third of the diameter of the hexagonal perforations 54. The hexagonal perforations 54 were all the same size. Vent holes 55 open out the back face 56 of sheet 51 into a hollow area 57 bounded by the three legs 58 of U-shaped frame 52. Channels 55A are provided in the back-face 56 of sheet 51 to link each column of vent holes 55 to facilitate venting therethrough. Screw holes 59 are also provided in the walls of legs 58 for fastening mold plate 50 to the Carver press. One of these mold plates 50 were used as the upper mold plate in a Carver press as described above to prepare the expanded blank shown in FIGS. 15–16. Venting of the back of the mold plate to the outside of the plate is accomplished through the open wall of U-shaped frame 58, which is not shown.

Figure 15:
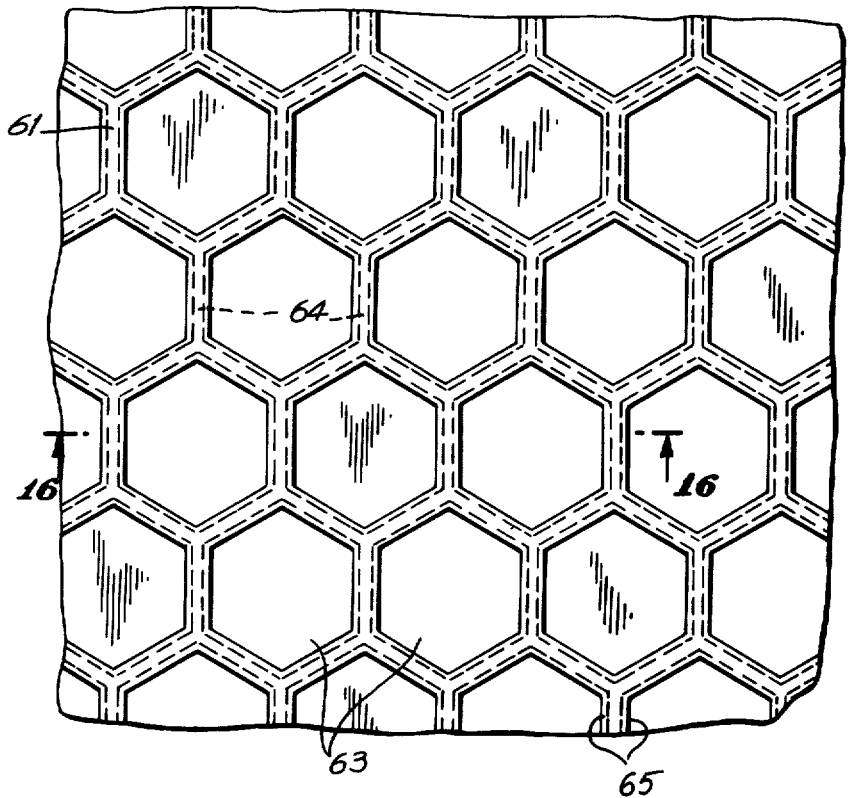
FIGS. 15 and 16 show partial top and cross-sectional views, respectively, of a multicell container which may be made with the mold plate of FIGS. 12-14.
Figure 16:
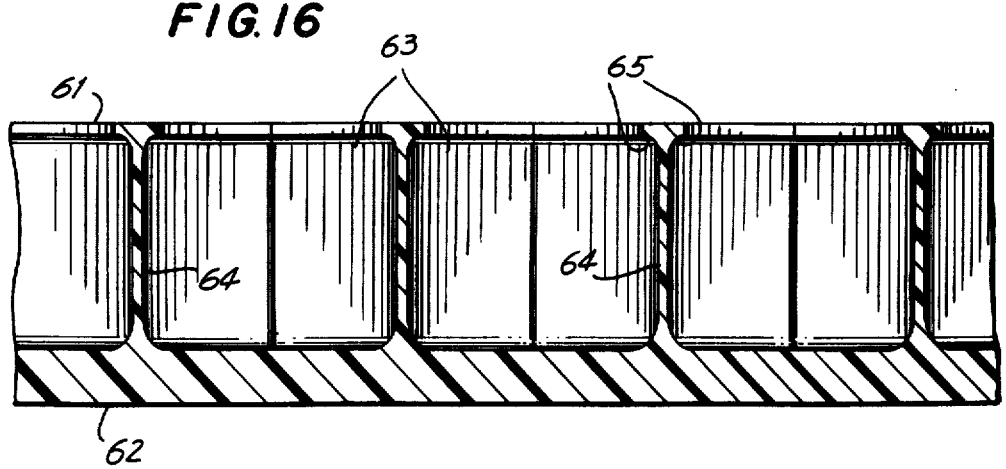

FIG. 15 shows a top view and FIG. 16 shows a cross-sectional view of expanded blank 60 made with mold plate 50 as a top mold plate in a Carver press. The top face 61 of expanded blank 60 provides a replication of the perforated surface of the upper plate 50 of the press to which blank 60 adhered during the expansion step. The lower face 62 of the expanded blank is a flat continuous member which adhered to the flat surface of the lower mold plate 5B.

FIG. 16 shows a cross-section of expanded blank 60. Expanded blank 60 provides one set of regularly shaped and spaced cells 63 which are open at the upper face 61 of blank 60 and sealed at the base 62 thereof. Each cell 63 is hexagonal in shape. The cells are separated by I beam shaped rib members 64. The rib members 64 defining each cell project vertically from base member 62. The tops of rib members 64 provide the continuous portion of the perforated top face 61 of expanded blank 60. Lip members 65 which are present around the periphery of each cell 63 are not too pronounced because of the relatively close spacing and alignment of the perforations in the upper mold plate 50 with which expanded blank 60 was prepared, and also because the perforations were angular and not circular or arcuate. The use of a circular or arcuate shaped perforation in the platens tends to produce a more pronounced lip member around the periphery of the cell openings in the expanded blank, as shown in FIGS. 6–7.

During the expansion of the sheet of plastic to form expanded blank 60 cells 63 were vented, in turn, through the perforations 54, vent holes 55, channels 55A, and the open wall of U-shaped frame 58 in upper mold plate 50 of the press.

Figure 17:
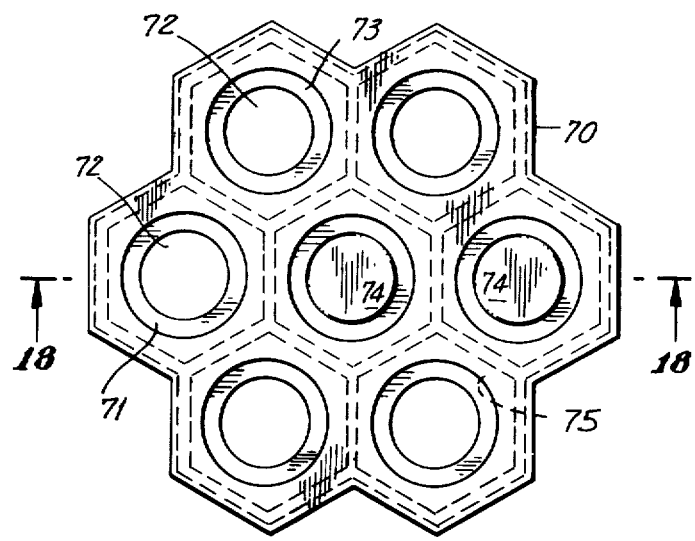
FIGS. 17 and 18 show top and cross-sectional views of a modified multicell container of FIG. 10.
Figure 18:
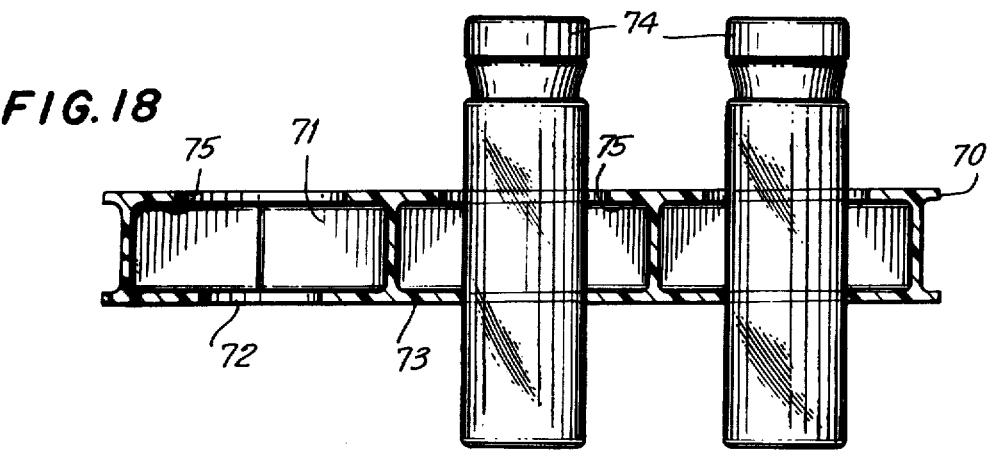

FIGS. 17 and 18 show a further way in which the expanded blanks of the present invention may be used. The expanded plastic container 70 shown in FIGS. 17 and 18 was prepared from an expanded container of the type shown in FIG. 10. This type of container was prepared by expanding a blank of plastic to a limited degree so as to provide cells 37 as shown in FIG. 10, and 71 as shown in FIG. 17, which are of relatively shallow depth. After the container was prepared as shown in FIG. 10, a perforation 72 was then punched through the continuous base member 73 at the center of each cell 71. The perforations 72 shown in FIG. 17 were circular, and of a smaller diameter than the openings of cells 71. Perforations 72 are of a size to accommodate vials 74, so as to hold vials 74 snugly in place. Perforations 72 can be of the same diameter as the openings of cells 71, so that lip member 75 which is around the periphery of the opening of each cell 71 can also be used to hold the vials 74 in place. Where perforations 72 are of a larger diameter than the openings of cells 71, only lip member 75 will hold the vial in place. It is preferable to use the perforated base member 73 as the main support for containers such as vials 74, since base member 73 will usually be thicker than lip member 75, and thus be able to support a larger load. The use of flexible resins is preferred for this type of application to facilitate the insertion and removal of the voids in the perforations.

Modified multicell containers 70 may be used for the packaging or carrying of various types of glass and metal containers. They may be used, in cartons, as separators. To separate fragile containers during shipment, they may also be used as carrying cases for the retail sale of items such as canned or bottled beer, soda and the like, which are commonly sold in so-called "six-packs".

The amount of pressure used to pull the plates of the press apart in the process of the present invention is about 1 to 10 pounds per square inch of continuous surface area on the blank contact surface of the plates.

Where the compositions used for the thermoformable blank contain fillers, the expansion temperature may have to be increased 5° to 20°C. to compensate for the increased viscosity of the resulting compositions.

The multicelled container thus formed in an integral manner, i.e., from a single compound or composition and in an essentially one step forming process, may be said to comprise a continuous base member, a plurality of wall members projecting vertically from such base member, and defining a plurality of cells, each of such cells being open at the top thereof and sealed at the base thereof by such base member and having the sides thereof defined by a plurality of such wall members, with adjoining cells sharing common wall members, and each of such cells having at its open end a continuous lip member projecting inwardly from all of the wall membmers defining the sides of such cells.

For most of these end use applications it is desirable, as noted above, to so expand the blank so that the integrity of the I-beam shaped wall members that separate the cells in the expanded blank is maintained. That is, the vacuums that arise in these cells are vented to avoid rupturing such wall members. For some applications, however, it may be desirable to intentionally cause a rupturing of such wall members. This can be accomplished, even while venting the vacuums in the cells, by continuing to expand the blank to such an extent that the wall members become thinner and thinner and eventually rupture, leaving punctures therein. The punctures can thus be provided uniformly in one or more of the wall members in all of the cells. The expanded blanks made with such ruptured wall members can be tolerated in containers where the side walls are not needed to cushion or separate fragile articles contained therein.

The use of an upper mold plate having triangular, rectangular, or hexagonal perforations therein will produce cells having three, four and six walls respectively, and the cells will be triangular, rectangular and hexagonal, respectively in shape. Where the perforations are circular, and the perforations are placed in staggered rows and columns, as shown in FIG. 1 of the drawings, the resulting cells are also hexagonal in shape. Where the perforations are circular and they are arranged in aligned rows and columns, then square shaped cells will result. The lip members are arcuate or circular when hexagonal shaped cells are produced, and angular when triangular and rectangular cells are produced.

THE THERMOFORMABLE MATERIALS

The materials which may be employed as the blanks in the present invention are normally solid thermoformable materials which have a Ta of about 50° to 300°C., and preferably of about 100° to 250°C.

If there is a difference of at least about 10°C. between the melting points of any two fusible materials that could be used as the mold plates, then the fusible material having the lower melting point could be used as a blank while the fusible material having the higher melting point could be used as the mold plate.

The blanks are preferably used in the form of sheet. The fusible material used for the blank need not have any elastomeric qualities.

Fusible materials which might be used as blanks would include natural and synthetic thermoplastic resins and thermosetting resins, glass and low melting elemental metals and alloys and compounds thereof.

The natural resins would include materials such as asphalt, bitumen, gums, pitch and tar.

The synthetic resins would include the vinyl resins. These vinyl resins may be either homopolymers of an individual vinyl monomer or they may be interpolymers of one or more vinyl monomer and from 0 to about 50 mol per cent of one or more non-vinyl monomers which are interpolymerizable with vinyl monomers. The term "vinyl monomer" means a compound which contains at least one polymerizable group of the formula -C=C.

Such vinyl monomers, therefore, would include the following: unsubstituted olefins, including mono-olefins such as ethylene, propylene, 1-butene, and isobutylene and polyolefins such as butadiene, isoprene, dicyclopentadiene and norbornene; halogenated olefins such as chloroprene, tetrafluoroethylene, chlorotrifluoroethylene, hexafluoropropylene; vinyl aryls such as styrene, o-methoxystyrene, p-methoxystyrene, o-nitrostyrene, p-nitrostyrene, o-methylstyrene, p-methylstyrene, m-methylstyrene, vinylnaphthalene and the like; vinyl and vinylidene halides, such as vinyl chloride, vinyl fluoride, vinylidene chloride, vinylidene fluoride, vinylidene bromide and the like; vinyl esters such as vinyl formate, vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl esters and ketones such as vinyl methyl ether, vinyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrollidone, ethyl methylene malonate, acrolein, vinyl alcohol, vinyl acetal, vinyl butyral and the like. Non-vinyl monomers which may be interpolymerizable with vinyl monomers include carbon monoxide and formaldehyde.

The vinyl polymers would thus include, for example, polyethylene, polypropylene, ethylene-propylene copolymers, polyvinyl chloride, polyvinylidene chloride, polyvinyl fluoride, polystyrene, styrene-butadiene-acrylonitrile terpolymers, ethylene-vinyl-acetate copolymers, ethylene-acrylic acid copolymers, ethylene-acrylonitrile copolymers and styrene-acrylonitrile copolymers.

In addition to the vinyl polymers, other polymeric materials which may be used in accordance with the present invention include thermoplastic polyurethane resins; polyamide resins, such as the nylon resins, including polyhexamethylene adipamide; polysulfone resins; polycarbonate resins; phenoxy resins; polyacetal resins; polyalkylene oxide resins such as polyethylene oxide and polypropylene oxide; polyphenylene oxide resins; and cellulose ester resins such as cellulose nitrate, cellulose acetate and cellulose pripionate.

Also included within the term "polymer" are blends of two or more polymeric materials. Illustrative of such blends are polyethylene/polypropylene; low density polyethylene/high density polyethylene; polyethylene with olefin interpolymers such as those indicated above, for example, ethylene-acrylic acid copolymers, ethylene-ethyl methacrylate copolymers, ethylene-ethylacrylate copolymers, ethylene-vinyl acetate copolymers, ethylene-acrylic acid-ethylacrylate terpolymers, ethylene-acrylic acid-vinylacetate terpolymers, and the like.

Also included within the term "polymer" are the metallic salts of those polymers or blends thereof which contain free carboxylic acid groups. Illustrative of such polymers are ethylene-methacrylic acid copolymers, ethylene-ethacrylic acid copolymers, styrene-acrylic acid copolymers, butene-acrylic acid copolymers, and the like.

Illustrative of the metals which may be used to provide the salts of such carboxylic acid polymers are the 1, 2, and 3 valent metals such as sodium, lithium, potassium, calcium, magnesium, aluminum, barium, zinc, zirconium, beryllium, iron, nickel, cobalt, and the like.

The polymers from which the blanks are shaped may be used in any of the forms in which they are commonly employed in the molding arts such as in the form of powder, pellets, granules and the like, and blends of the same with one or more adjuvant materials. Such adjuvant material would include materials such as plasticizers, heat and light stabilizers, fillers, pigments, processing acids, extenders, fibrous reinforcing agents, impact improvers and metal, carbon and glass fibers and particles.

The particular polymeric material being used would dictate the selection and quantity of the adjuvants to be employed therewith, since it is the respective adjuvants for such polymers that are employed in the present invention. The adjuvants employed must be physically and chemically compatible with each of the other components of the compositions under the described operating conditions. The adjuvants are used in amounts which will be effective for the intended purpose. Thus, for example, the effective amount of plasticizer is a "plasticizing amount", that is, an amount of plasticizer which will appreciably increase the flexibility, processability, workability and/or distensibility of the polymer. The stabilizers would be used in a stabilizingly effective quantity, and the fillers would be used in effective quantities therefor, as for example, if a reinforcing filler is to be used then the filler would be used in such amounts as to provide the desired reinforcing effect.

Where the compositions used for the thermoformable blank contain fillers, the expansion temperature may have to be increased 5° to 20°C. to compensate for the increased viscosity of the resulting compositions.

The polymer based compositions employed in the present invention may be prepared by any of the commonly employed techniques employed for compounding such compositions. Such procedures would include techniques such as dry blending or hot compounding, as well as with or without the use of mixing equipment such as ribbon blenders, muller blenders, intensive mixer blenders, extruders, banbury mixers and the like.

Although metallic materials of construction are usually only used as the mold plates in the process of the present invention, it is possible that blanks of the present invention can also be made wherein a low melting metal, or alloy or compound thereof, can be used as the blank with mold plates made from non-fusible materials, or materials having higher fusion points than such low melting metallic materials.

Some rigid polymeric materials such as polysulfone resins, polycarbonate resins, and certain vinyl resins such as polyvinyl chloride, tend to develop internal stresses and associated frozen-in-strains when press formed into blanks. When such stesses and strains are present, it is not possible to readily use the blanks in the process of the present invention unless the blanks are first annealed to relax such stresses and strains in the blank. This annealing can be accomplished in about 0.5 to 240 minutes at temperatures ranging from the heat distortion temperature to the melting point of the resin as disclosed in U.S. patent application Ser. No. 213,432 filed Dec. 29, 1971 in the names of Walter H. Smarook and John Sonia now abandoned in favor of continuation-in-part patent application Ser. No. 427,480 filed Dec. 26, 1973.

THE MOLD PLATES AND PLATENS

The mold plates and platens used to pull the blank apart can be made of the same or different materials. The mold plates and platens may have continuous or perforated surfaces as discussed above, they may also be porous or non-porous, planar or non-planar and matching.

During the molding operation it is desirable as noted above, to vent the cells of the blanks which are being pulled apart. The need for venting the blanks being expanded, as noted above, arises due to the fact that a vacuum is created within the cells of the blank by virtue of the increase of the volume of such cells during the expansion operation. If the blank is not vented during the expansion operation, atmospheric pressure could cause puncture of the extended rib sections of the expanded blank during the expansion operation. This venting of the expanded blank is accomplished by using perforated top mold plates as the perforation means or by using porous top mold plates with the "negative" type perforation means discussed above.

The materials from which the mold plates may be fabricated are normally solid materials which are either not fusible at the operating temperatures or which have a melting point which is at least 10°C. higher than the melting point of the fusible material from which the blank is fabricated.

Non-fusible materials which may be used for the mold plates would include cellulosic materials such as wood, paper, cardboard and compressed sawdust; thermoset or vulcanized compositions based on natural or synthetic resins; minerals such as graphite, clay and quartz; natural rock and stone materials such as marble and slate; building materials such as brick, tile, wallboard and concrete; and proteinaceous materials such as leather and hides.

Fusible materials having a relatively high Tg or Tm which could be used as the mold plates would include metals such as aluminum, iron, lead, nickel, magnesium, copper, silver and tin, as well as alloys and compounds of such metals, such as steel, brass and bronze; vitreous materials such as glass, ceramics and porcelain; and thermoplastic resins having a relatively very high fusion point, such as the so called engineering plastics, such as polytetrafluoroethylene, nylon-6 resins, polyacetal resins, polyvinylidene fluoride, polyesters and polyvinyl fluoride; or fusible materials coated with polytetrafluoroethylene.

The use of mold release agents such as silicone oils and fluorocarbon oils, or the use of mold plates made of materials having a low surface energy such as polytetrafluoroethylene, will insure the separation of the cooled expanded blank from the mold plates after the expansion operation, when the cooled expanded blank would not otherwise readily separate from the mold plates.

For various applications it may be desirable to promote the adhesion of the expanded blank to the lower mold plates where the lower mold plate is to be laminated to the expanded container. Certain compounds can be used as adhesion promoters for such purposes. The preferred of these adhesion promoters are various organosilicon compounds. These adhesion promoters may be used as primers and applied to the surfaces of the laminae substrates in layers which are at least monomolecular in depth. The adhesion promoters may also be incorporated or admixed in with the components of the expandable blank. In the latter case, the adhesion promoter is added to the blank in an amount of about 0.00001 to 5.0 per cent by weight based on the weight of the blank.

When the organo-silicon compound is to be used as a primer or incorporated into the blank, it may be used in the form of a solution in an organic solvent such as an alcohol, an ester, a ketone, an aromatic or aliphatic hydrocarbon, a halogenated hydrocarbon, or mixtures of such solvents.

Examples of the organo-silicon compounds which may be used include silyl peroxide compounds, alkoxy silanes, amino-alkoxy silanes, vinyl alkoxy silanes and amino-alkylalkoxy silanes.

The silyl peroxide compounds may be in the form of a monomer or polymer, e.g., silane or siloxane-containing compound which contains an organo-peroxy group bonded to silicon, which organo moiety is bonded to the peroxy oxygen and thence to the silicon by a non-carbonyl carbon atom.

These silyl peroxides can be made pursuant to the processes described in U.S. Pat. No. 3,631,161 and Canadian Pat. No. 924,230.

Specific examples of such silyl peroxide compounds are vinyl tris(t-butylperoxy)silane, allyl tris(t-butylperoxy)silane, tetratris(t-butylperoxy)silane, allyl(t-butylperoxy)tetrasiloxane, vinyl methyl bis(t-butylperoxy)silane, vinyl tris(α, α-dimethyl benzylperoxy)silane, allyl methyl bis(t-butylperoxy) silane, methyl tris(t-butylperoxy)silane, dimethyl bis(t-butylperoxy)silane, isocyanatopropyl tris (t-butylperoxy)silane and vinyl diacetoxy(t-butylperoxy)silane.

The amino alkyl alkoxy silanes would include those having the structure:

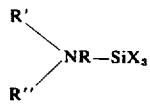

wherein X is alkoxy, aroxy or acryloxy; R is divalent alkylene of 3–8 carbon atoms with at least three sequental carbon atoms separating N from Si; at least one of R' and R" is hydrogen, and any remaining R' or R" is alkyl, HO [CH$_2$CH$_2$(O)$_x$]$_{1-3}$ where $x$ is 0 or 1, H$_2$NCO-, H$_2$NCH$_2$CH$_2$— and H$_2$NCH$_2$CH$_2$NHCH$_2$CH$_2$—.

Examples of such aminoalkyl-alkoxy silanes would include gamma-aminopropyltriethoxy silane, gammaaminopropyltrimethoxy silane, bis(beta-hydroxy methyl) gamma-aminopropyltriethoxy silane and N-beta-(aminoethyl)gamma-aminopropyl triethoxy silane.

As noted above, one or both of the surfaces of the plates which are used to adhere to, and pull and expand the blank of plastic, may be an integral part of the press platens or molding device. One or both of the mold plates may also be removably mountable on the platen or molding device. The use of the removable type of mold plate is preferable where the mold plates are to be perforated or porous, so as to effect the venting therethrough.

The following examples are merely illustrative of the present invention and are not intended as a limitation upon the scope thereof.

The press used in these examples was a spring loaded Carver press, as shown in FIGS. 3 to 5 of the drawings. Two springs were used in the press and each had a deflection of 130 pounds per inch, and the springs were designed to mechanically pull the platens and mold plates apart, as explained above with reference to FIGS. 3 to 5, at a predetermined rate, as regulated by a needle valve on the hydraulic ram of the press. The platens of the press were malleable cast iron and could be cooled by conduction, as desired, by the circulation of cold water therethrough. The platens of the press could also be heated by conduction, as desired, by heating platens 5A and 5B electrically. The temperature of the surfaces of the heated mold plates and the platens was measured with a thermocoupled pyrometer.

EXAMPLE 1

A 100 mil thick sheet (6 × 6 inches) of low density polyethylene (density 0.92; melt index 2.0) having a Ta of 120°C. was inserted into a Carver press at 170°C. The Carver press was as shown in FIG. 3 of the drawings. The upper mold plate 1 was of aluminum, and the perforations therein had the staggered circular hole configuration shown in FIG. 1, with 1 inch diameter holes which were spaced one-eighth inch from each other (between the outer edges thereof). The mold plate measured 6 × 6 inches × ⅛ inch. At a temperature of 160°C., the blank was compressed slightly to effect hot tack adhesion with the upper mold plate 1, and lower platen 5B of the press, and then expanded at the rate of 15 mils/second to 20 times its original thickness. Upon cooling to 35°C., the press was opened and the expanded blank was removed from the press. The resulting expanded article had the configuration shown in FIGS. 6 to 8 of the drawings. The base member and upper surface were about 2 to 5 mils thick. The lip member 12 around the opening of each cell was about 2/32 inch to 4/32 inch wide. During the expansion step in the process the cells in the expanding blank were vented through perforations 2 in the upper mold plate 1 as discussed above. When size C dry cell batteries were inserted into open cells 7 of the expanded multicell container, they were held snugly therein by lip members 12, even when the container was turned upside down. The shoulders of the tops of the batteries fitted snugly under lip members 12 of the cells, with the metal contacts at the tops of the batteries protruding above such lip members.

EXAMPLE 2

The procedure of Example 1 was followed using, as the blank, a 65 mil thick sheet (6 × 6 inches) of an ethylene-ethyl acrylate copolymer having a Ta of 110°C. The sheet was inserted in the press at 150°C., and pulled at a temperature of 140°C. to a height of 1.00 inch. The expanded article had the configuration shown in FIGS. 6 to 8 of the drawings and was much more flexible than the multicell container made in Example 1.

EXAMPLE 3

The procedure of Example 1 was followed using, as the blank, a 65 mil thick sheet (6 × 6 inches) of an ethylene-ethyl acrylate copolymer having a Ta of 110°C. The top mold plate used in this example was of aluminum and had a staggered circular hole configuration as shown in FIG. 1, with ¾ inch diameter holes which were spaced ⅛ inch apart, between the outer edges thereof. The mold plate measured 6 × 6 inches × ⅛ inch. The blank was pulled at the rate of 15 mils/second to an expanded height of 0.40 inch. The expanded multicell container had the configuration shown in FIGS. 6 to 8, although the cells were of smaller diameter than those in the multicell containers made in Examples 1 and 2. Lip members 12 of the cells were about 1/32 to 3/32 inch wide. The continuous base member and upper surface of the expanded container were about 2–5 mils thick. The cells in the expanding blank were vented through the perforations in the upper mold plate during the expansion step in the process.

EXAMPLE 4

A 65 mil thick sheet (6 × 6 inches) of ethyleneethyl acrylate copolymer having a Ta of 110°C. was expanded in a Carver press using, as the top mold plate therein, a mold plate as shown in FIGS. 12 to 14 of the drawings. The contact surface of the mold measured 6 × 6 inches. The hexagonal perforations in the contact surface of the mold plate were aligned in rows and columns as shown in FIG. 12 with each hexagonal perforation spaced about 3/32 inch from the next adjacent perforation. Each hexagonal perforation had a diameter of ½ inch and was about 1/16 inch deep.

The blank of plastic was inserted in the mold at 150°C. and expanded at 140°C., at the rate of 15 mils/second, to an expanded height of 0.40 inch. The resulting expanded article had the configuration of expanded article 60 shown in FIGS. 15 and 16 of the drawings. This configuration is essentially the same as that of the expanded article shown in FIGS. 6 and 7 of the drawings, with the exception that the cells are much smaller. The lip member 65 around each cell 63 were about 1/32 inch wide, and the continuous base member 62 and the top surface 61 of the expanded blank 60 was about 2 to 5 mils thick. The cells were useful as containers for small vials or perfumes, pills, and the like.

EXAMPLE 5

A 6 × 6 inches layer of woven glass cloth was melt laminated between two 65 mil thick sheets (6 × 6 inches) of the copolymer of Example 4. This blank was then expanded as in Example 4 and the resulting exapanded blank had the configuration of the one made in Example 4 with the exception that the continuous base member was an approximately 65 mil thick, glass reinforced, sheet of polymer. This base member provided added strength and rigidity to the resulting multicelled container.

EXAMPLE 6

A 65 mil thick sheet (6 × 6 inches) of thermoplastic polyester polyurethane having a Ta of 160–180°C. was expanded as in Example 4. The blank was inserted in the press at 180°C. and expanded at 170°C. at the rate of 10 mils/second to an expanded height of 0.40 inch. The expanded multicell container had the configuration of the expanded article shown in FIGS. 15–16 of the drawings. It was very flexible and useful, in continuous form, as a conveyor belt for the movement of liquid and particulate materials, or packaged items.

EXAMPLE 7

Packaging or shipping containers for vials and similar articles of the type shown in FIGS. 17–18 of the drawings were made from expanded blanks 70 prepared as in Example 3 above by punching out ½ inch diameter holes in the base 73 of each cell 71 to accommodate small glass vials 74 inserted therein. These ½ inch holes were smaller than the ¾ inch openings in the tops of the cells, so that the vials were held firmly in place only by the punched out base member 73, and not by lip members 75.

EXAMPLE 8

Nylon-6 resin having a Ta of 240° was milled with 33% by weight of silicon carbide (180 grit) so as to provide sheet of the resulting composition. The resulting sheet was then laminated with cloth netting to reinforce the plastic based sheet. The resulting sheet was 115 mils thick. A 6 × 6 inches sample of this sheet was then expanded in a Carver press employing an upper mold plate having hexagonal perforations therein as disclosed in Example 4. The blank was inserted in the press at 260°C. and expanded at 250°C. at the rate of 15 mils/second so as to provide cells which were approximately ⅛ inch deep. The expanded blank was then cut into the form of a wheel having an outside diameter of about 5½ inches, and a hollow tapered circle at the center thereof. The hollow tapered circle had a diameter of 1½ inches at the upper perforated face of the expanded blank, and a diameter of 1¼ inches at the rear continuous face of the expanded blank. The thus produced expanded blank was used at 800 revolutions per minute with a water spray coolant as a polishing disc for the polishing of stainless steel and hot rolled steel substrates. When filled blanks are used the expansion temperature is increased to compensate for the increased viscosity of the fused blank.

Various polymeric resins used as the expandable blanks tend to pick up moisture when exposed to the atmosphere, i.e., about 0.05 to 5.0 weight %. This moisture is preferably removed from the plastic before inserting the plastic in the hot press so as to avoid blistering or bubbling in the heated plastic. The plastics which are more susceptible to this type of moisture absorption are the polycarbonate resins, polymethymethacrylate resins, nylon resins, cellulose acetate resins, acrylonitrile-butadiene-styrene terpolymer resins, hydroxy propyl cellulose resins, styrene-acrylonitrile copolymer resins and phenoxy resins.

For practical purposes the process of the present invention is preferably conducted under ambient conditions of pressure, i.e. atmospheric pressure. The areas, cells or voids of reduced pressure that are formed within the expanding blank during the expansion step in the process have partial vacuums therein. Thus, the level of pressure in the voids is below that of the higher level of ambient atmospheric pressure. The venting of the void areas during the expansion step is to allow these two levels of pressure to be equilibrated so as to otherwise avoid rupturing of the cell walls existing between the void areas. The partial vacuums are created in the voids areas within the blank during the expansion step in the process of the present invention because the volume of the void or cell is created and expanded within a body of plastic whose interior has no access to the ambient atmosphere other than through the venting means. The difference between the level of ambient pressure and the level of reduced pressure existing under the partial vacuum conditions in the void areas is sufficient, in the absence of such venting, to rupture the relatively thin walls of expanded thermoformable material that separate the cells of reduced pressure from each other.

The blanks are uniformly heated prior to the beginning of the expansion step in the process. This can be accomplished by heating the blanks before or after they are inserted between the platens. Where the blanks are relatively thin, i.e., of the order of ≤ 150 mils, they can be readily heated, to the Ta of the thermoformable material therein, between the heated platens. The length of time needed to accomplish this will vary depending on the thickness of the blank, the Ta value, and the thermal conductivity and heat capacity of the thermoformable material, and the amount of contact that exists between the surfaces of the blank and the surfaces of the platen(s). This heating can be accomplished by contact with one or both of the platens.

Where the blanks are thicker than about 150 mils, and/or have relatively high Ta values, and/or will have relatively little contact with the platen surfaces, they can also be heated to a temperature which is, for crystalline materials, about 20°C. below the Tm of such materials, and for amorphous materials, about 20°C below the Ta of the amorphous material, before the blank is inserted between the platens, and then the blanks can be heated to the Ta of the thermoformable material by being heated by contact with the platens and/or by other heating procedures such as by infrared radiation.

The cooling of the expanded blank is conducted so as to solidify or freeze, so to speak, the expanded article in its expanded configuration. This is done by cooling the article below its heat distortion point. This does not necessarily require a quenching, or quick cooling operation, unless the expanded thermoformable material is very fluid and/or has relatively thick wall members. Otherwise the cooling can be performed, in most cases, by merely exposing the expanded article to ambient air at about 25°–30°C., i.e., room temperature and/or by cooling the mold surfaces with a cooling medium, such as cold water, that is circulated through the interior of the mold plates. In some cases the cooling can also be hastened by spraying the expanded article with a spray of cool water or other cooling gas or liquid.

The Ta values for a thermoformable material which are reported above were found to be, approximately, the lowest temperatures at which the related thermoformable material could be used in the process of the present invention. The reported Ta values were found, initially, by a trial-and-error technique in which a heated sheet of the thermoformable material (6 × 6 inches × 100 mils) was placed between continuous sheets of aluminum (6 × 6 inches × 100 mils) so as to ascertain, empirically, by trial-and-error, the minimum temperature at which the process of the present invention could be conducted. The reported Ta value was thus the minimum temperature at which the thermoformable material would adhere to the sheet of aluminum with sufficient force so that mechanical work applied to the molten thermoformable material, in the form of the pulling of the two sheets of aluminum apart, produced a viscous flow in the thermoformable material without loss of adhesion to the aluminum plates, as the plates were pulled apart to a height of at least 12 times its original thickness.

These same minimum Ta values, as determined with aluminum mold plates, were also found to be the same (within about ± 1°-2°C.) for the respective thermoformable materials when the mold plates were also made of other metals such as steel and brass, and the other conditions were the same.

Subsequent to the intial trial-and-error procedures that were used, as described above, to determine the above reported minimum Ta values for the various listed thermoformable materials, a more rigorous experimental approach was used to ascertain the minimum Ta values for such thermoformable materials. In this procedure an Instron Tensile Strength Tester was used to evaluate each thermoformable material to ascertain its minimum Ta values. The Instron instrument comprised a heated set of metal discs of known cross-sectional areas (0.994 in$^2$) which were thermostatically controlled and housed in a sealable chamber having pyrex windows in the walls thereof for observation purposes. A 100 mil thick disc sample (0.994 in$^2$) of the thermoformable material was then inserted between the metal discs which were heated near the previously (empirically) determined Ta value for such material. The instrument was then subjected to a compressive load of 2 psi for 5 seconds to allow the thermoformable material to be fused by the metal discs and to wet the discs with such material. The instrument was then subjected to a tensile loading at a crosshead speed of 2 inches per minute to determine the minimum temperature at which the thermoformable material was fluid enough to be pulled apart while still adhering to the discs. The tensile loadings required to accomplish this vary from thermoformable material to thermoformable material but were in the range of about 6 to 10 psi of tensile force for the synthetic resins whose (minimum) Ta values are reported above.

It was found that the minimum Ta values, when the thermoformable materials were tested in the Instron tensile tester as noted above, were within ± 1°-2°C. of the minimum Ta values which had been previously found for such materials in the initial trial and-error procedures. These minimum Ta values were also within about ± 1°-2°C. for each of such thermoformable materials regardless of whether the metal used in the metal discs of the Instron tensile tester was aluminum, cold rolled steel, hot rolled steel, zinc plated steel or brass. The same results are also obtained when the metal disc was coated with a baked on coating of a dispersion grade of polytetrafluoroethylene. Polytetrafluoroethylene is not useful, however, as a thermoformable material in the process of the present invention since it does not melt with a useful Ta value.

These test results thus provide the basis for the Ta values reported above for each of the listed thermoformable materials. These reported Ta values, however, are the minimum temperatures at which the related thermoformable materials can be employed in the process of the present invention. The useful range of Ta values for a particular thermoformable material, with respect to its utility in the process of the present invention, will vary from thermoformable material to thermoformable material. Each thermoformable material has its own peculiar viscosity properties at elevated temperatures i.e., above its minimum Ta value. To be useful in the process of the present invention, at temperatures above its minimum Ta, the thermoformable material must be viscous enough to withstand the force of gravity and not sag between the mold plates during the separation of the mold plates. The useful range of Ta values, therefore, is that wherein the thermoformable material retains its adhesion to the mold plates and at which its melt viscosity is low enough to afford melt flow or extensibility, but at which it is not so fluid, or have such a low degree of viscosity, as to sag under the influence of the forces of gravity. Every material that can be melted usually becomes more fluid, or less viscous, as the temperature of the melt is increased. To be useful in the process of the present invention the thermoformable material cannot be heated so high above its minimum Ta value as to become so fluid in its expanded condition that it has more tendency to sag during the molding cycle under the influence of gravity than to retain its expanded configuration.

As a practical matter as the blank is separated between the hot mold plates, those portions of the expanded blank that are in the cross-section of the expanded blank, and are not in direct contact with the heated mold plates, tend to cool faster and become more viscous, than those portions of the blank that remain in contact with the mold plates.

In the case of crystalline thermoformable materials the useful range of Ta values is relatively narrow, and, in the case of some such materials the useful range of Ta values may only be 5° to 10°C. above the Tm of such materials. In the case of amorphous thermoformable materials the useful range of Ta values is usually broader.

It is to be noted also, that, in the case of polymeric thermoformable materials, the Ta values of polymeric materials made from the same monomers will vary depending on the molecular weight of the polymer. The Ta values for such polymers will usually be proportionally higher as the molecular weight of the polymer is increased.

The speed with which the blank of thermoformable material can be expanded between the mold plates within the useful range of Ta values will also depend on several factors such as the viscosity of the thermoformable material at the Ta value employed, the mass and shape of the thermoformable material, the amount of area of contact between the surface of the mold plates and the surfaces of the blank, and the complexity of the cross-sectional geometry of the expanded article.

What is claimed is:

1. A process for integrally forming a multicell container between the surfaces of mold plates from a blank of thermoformable material which is in the form of a sheet having a top surface and a bottom surface, said thermoformable material having a Ta, which comprises, positioning said blank between a top mold plate and a bottom mold plate, each of said mold plates having a surface for contacting the top and bottom surfaces of said blank, and each of said mold plates having a fusion point which is higher than the Ta of said thermoformable material, the blank contacting surface of said bottom mold plate being continuous, and perforation means being used to provide a pattern of perforations at the interface between the top surface of said blank and the blank contact surface of the top mold plate, such pattern providing areas of contact and non-contact between the top surface of the blank and the blank contact surface of the top mold plate when said mold plates are brought into contact with said blank, bringing said plates together so as to cause them to contact said surfaces of said blank, heating said blank to its Ta, adhesively bonding said blank by hot tack adhesion to the blank contacting surfaces of said mold plates, pulling said mold plates apart while said blank is thus adhesively bonded thereto so as to draw a portion of the thermoformable material from the blank in the form of a plurality of multiwalled cells having common walls therebetween and open ends defined by said pattern of perforations, said pulling apart effecting partial vacuum conditions within said cells, venting said cells during said pulling apart so as to equilibrate the lower level of pressure within said cells with the higher level of ambient pressure without said cells so as to thereby regulate the uniformity and integrity of the configuration of the cells, cooling the resulting expanded blank to a temperature below the heat distortion temperature of said thermoformable material, and separating the cooled expanded blank from said mold plates.

2. A process as in claim 1 in which said venting is accomplished through said perforation means.

3. A process as in claim 2 in which said perforation means is a perforated top mold plate having venting means therein.

4. A process as in claim 2 in which said perforation means is a negative perforation means.

5. A process as in claim 4 in which said negative perforation means has venting means therein.

6. A process as in claim 4 in which said venting is accomplished between said top mold plate and said negative perforation means.

7. A process as in claim 1 in which said mold plates are pulled apart so as to provide cells of uniform height.

8. A process as in claim 1 in which said perforation means is a perforated mold plate.

9. A process as in claim 8 in which the perforations of said perforated mold plate are arcuate.

10. A process as in claim 9 in which the perforations in said perforated mold plate are circular.

11. A process as in claim 8 in which the perforations in said perforated top mold plate are angular.

12. A process as in claim 11 in which the perforations in said perforated mold plate are hexagonal.

13. A process as in claim 1 in which said thermoformable material comprises thermoplastic material.

14. A process as in claim 13 in which said thermoplastic material comprises synthetic resin.

15. A process as in claim 14 in which said synthetic resin comprises vinyl resin.

16. A process as in claim 15 in which said vinyl resin comprises ethylene polymer.

17. A process as in claim 16 in which said ethylene polymer is ethylene homopolymer.

18. a process as in claim 15 in which said vinyl resin comprises ethylene copolymer resin.

19. A process as in claim 18 in which said ethylene copolymer resin is a copolymer of ethylene and ethyl acrylate.

20. A process as in claim 14 in which said synthetic resin comprises polyurethane resin.

21. A process as in claim 14 in which said synthetic resin comprises nylon resin.

* * * * *

UNITED STATES PATENT OFFICE
CERTIFICATE OF CORRECTION

Patent No. 3,919,379                    Dated November 11, 1975

Inventor(s)  Walter H. Smarook

It is certified that error appears in the above-identified patent and that said Letters Patent are hereby corrected as shown below:

Column 3, in the table of Polymer(s), "4." should be aligned with "polyvinyl chloride".

Column 8, line 2, "." should read --,--.

Column 8, line 39, "and" should read --the--.

Column 9, line 34, "again" should read --against--.

Column 9, line 52, "to" should read --in--.

Column 9, line 60, "of" should read --or--.

Column 14, line 18, "membmers" should read --members--.

Column 15, line 11, "-C=C" should read -- -C=C- --.

Column 15, last line, "pripionate" should read --propionate--.

Column 16, line 31, "acids" should read --aids--.

Column 18, line 63, "tal" should read --tial--.

UNITED STATES PATENT OFFICE
CERTIFICATE OF CORRECTION

Patent No. 3,919,379  Dated November 11, 1975

Inventor(s) Walter H. Smarook

It is certified that error appears in the above-identified patent and that said Letters Patent are hereby corrected as shown below:

At each of column 19, lines 37 and 46,
  column 20, lines 4, 15, 21, 36, 40-41, 62 and 63-64,
  column 21, lines 6 and 35,
  column 22, last line to column 23, line 1, and
  column 23, line 2,
  "6 x 6 inches" should read --6 inch x 6 inch--.

Column 20, line 59, "or" should read --of--.

Column 21, line 61, "polymethymethacrylate" should read --polymethylmethacrylate--.

Column 22, line 26 "$<150$" should read --$\leq 150$--.

Signed and Sealed this

Nineteenth Day of October 1976

[SEAL]

Attest:

RUTH C. MASON
Attesting Officer

C. MARSHALL DANN
Commissioner of Patents and Trademarks